US005119323A

United States Patent [19]

Nickerson et al.

[11] Patent Number: 5,119,323

[45] Date of Patent: Jun. 2, 1992

[54] NUMERICAL PROCESSING OF OPTICAL WAVEFRONT DATA

[75] Inventors: Kelsey S. Nickerson, Arlington; Mark C. Reynolds, Cambridge; Andris Jankevics, Action, all of Mass.

[73] Assignee: United Technologies Corporation, Hartford, Conn.

[21] Appl. No.: 465,297

[22] Filed: Jan. 16, 1990

[51] Int. Cl.[5] G06F 7/38

[52] U.S. Cl. 364/735

[58] Field of Search 364/735, 736, 730, 713, 364/200, 900

[56] References Cited

U.S. PATENT DOCUMENTS

| | | | |
|---|---|---|---|
| 4,757,444 | 7/1988 | Aoyama et al. | 364/200 |
| 4,823,299 | 4/1989 | Chang et al. | 364/735 |
| 4,858,147 | 8/1989 | Conwell | 364/200 X |
| 4,888,721 | 12/1989 | Kondoh et al. | 364/736 |

*Primary Examiner*—Tan V. Mai

[57] ABSTRACT

A parallel processing system for iteratively solving a set of equations in an array of parallel processors compresses the input data by sequentially shifting and averaging the initial values to form a reduced array of averaged data; solving the equations for the reduced data; and then successively expanding the nth solution to form an (n+1)th approximation on an increased number of data points solving the equations on the data points and expanding the new solution to form the next approximation.

11 Claims, 5 Drawing Sheets

FIG.3
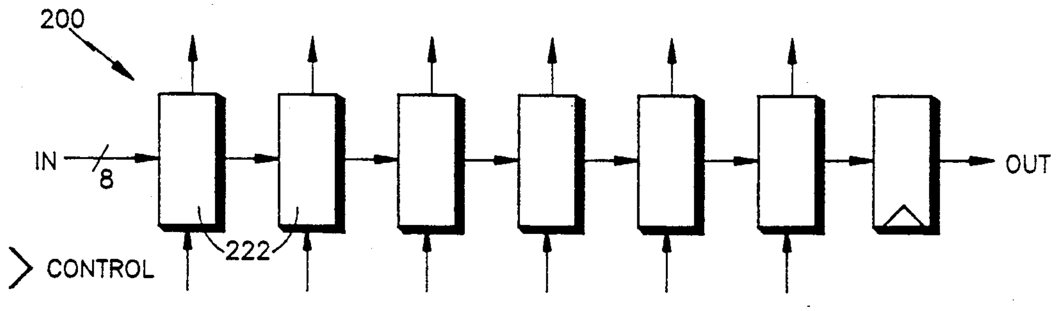
FIG.4
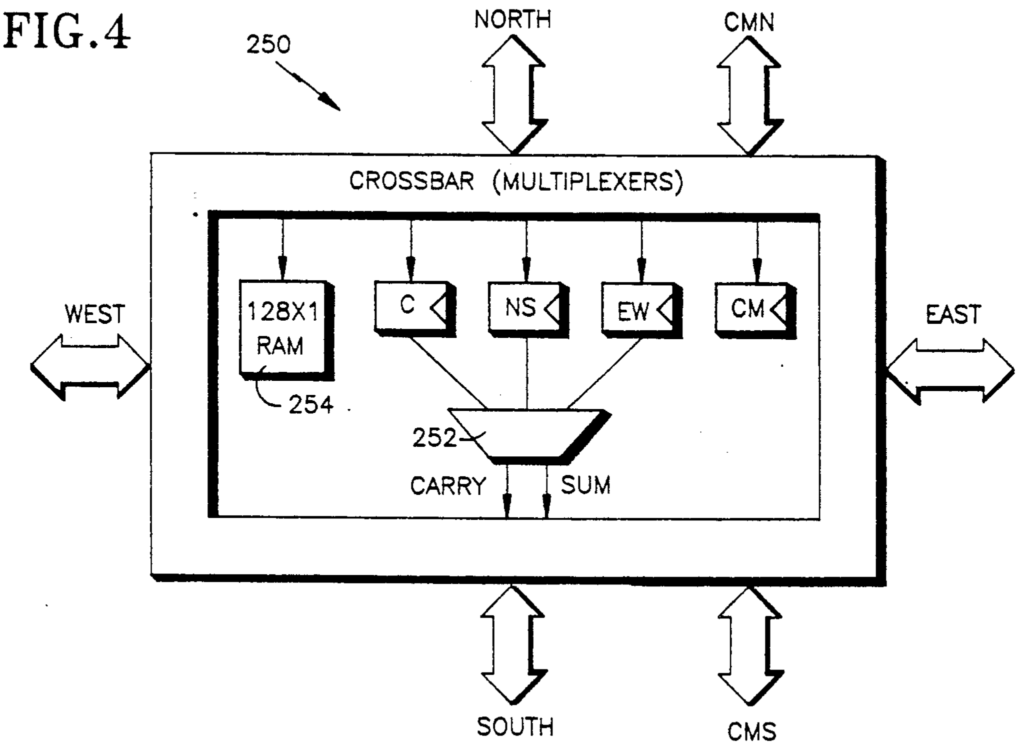
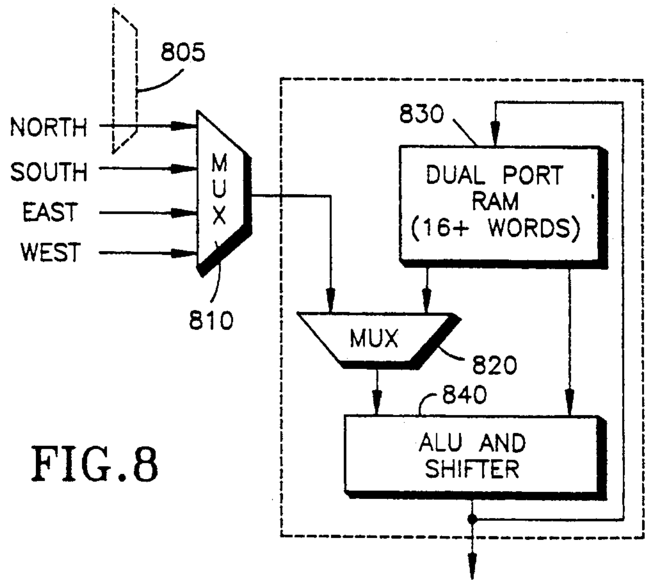
FIG.8

NUMERICAL PROCESSING OF OPTICAL WAVEFRONT DATA

This invention was made with Government support under Contract F30602-85-C-0285 awarded by the Department of the Air Force. The Government has certain rights in this invention.

DESCRIPTION

1. Technical Field

The field of the invention is that of adaptive optics, in particular, the subfield of measurement of optical wavefronts and computation of solutions to the wave equation.

2. Background Art

In controlling deformable mirrors or other devices which will manipulate an optical wavefront, it is necessary to sample the wavefront at a number of locations and then to solve the wave equation to determine what the solution of the wavefront is. Adaptive optical systems are, of course, "real time" systems so that it is necessary to arrive at a solution to the equations in a time that is dictated by the system design. In the case of large numbers of sample points, such as more than 1000, it is impossible with conventional computational techniques to solve the equations in the time typically allowed, less than a hundredth of a second.

The solution to the problem using a single computer or processor and an iterative Jacobi or Gauss-Seidel approach to the solution is well known but consumes an inordinate amount of time. As an order of magnitude estimate, it is regarded that the number of operations, such as equation solutions, required to solve the wave equations for a sample point of magnitude N will be on the order of $N^2$. Experiments with parallel processing systems, in which a number of CPUs operate in parallel on different data, reveal that these systems also are limited in that the number of operations required to implement a solution is prohibitively high.

The art has long sought a fast digital technique to solving the wave equations that is suitable for real time systems involving large numbers of data points.

DISCLOSURE OF INVENTION

The invention relates to a hardware system for reconstructing the wavefront of a sample beam in which a parallel array of processors operates with a novel method to solve the wave equation in a number of operations that is essentially proportional to the number of sample points.

Other features and advantages will be apparent from the specification and claims and from the accompanying drawings which illustrate an embodiment of the invention.

BRIEF DESCRIPTION OF DRAWINGS

FIG. 3 illustrates a detail from the system of FIG. 2.

FIG. 4 illustrates a logical block diagram of an individual processor.

FIG. 8 illustrates a prototype processor module useful in constructing systems according to the invention.

BEST MODE FOR CARRYING OUT THE INVENTION

Figure 1:
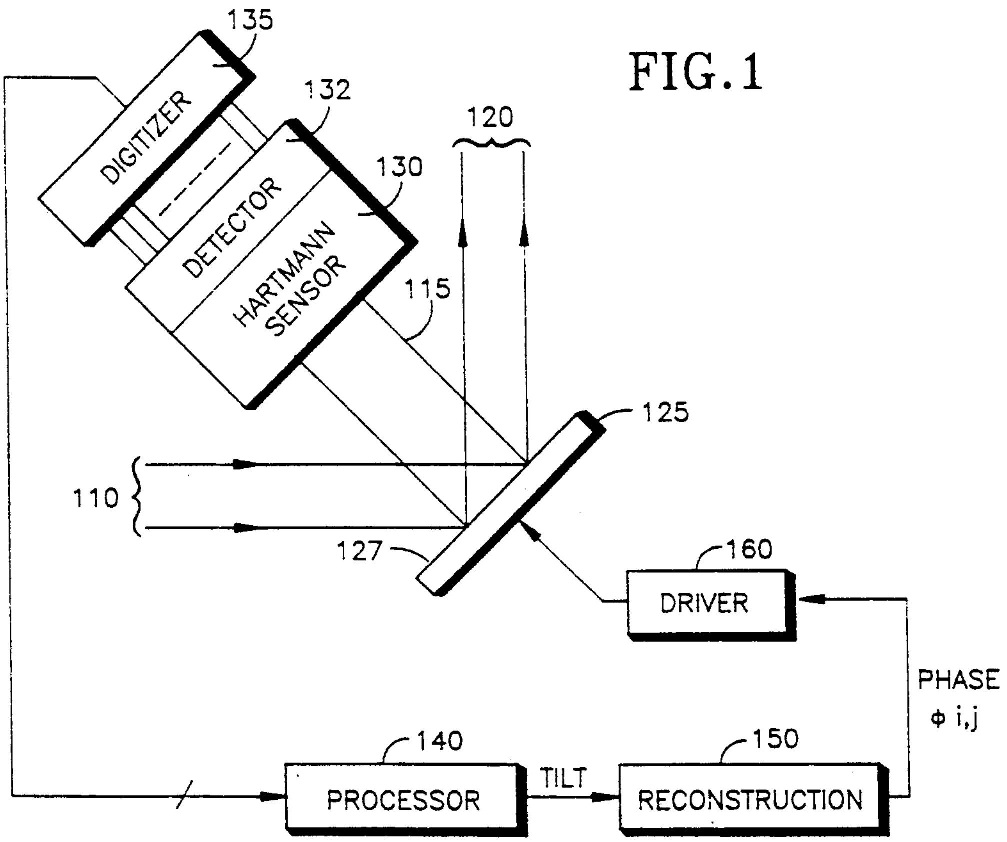
FIG. 1 illustrates an overall optical system in which the invention is to be used.

Referring now to FIG. 1, there is illustrated an overall system in which an input optical beam 110 strikes a deformable mirror 125 having a flexible surface 127 that can be adjusted in order to correct for deviations in the wavefront of beam 110. The bulk of the beam goes out as beam 120, but a sample beam is tapped off by beam sampling surface 127 and is shown as sample beam 115 entering a Hartmann or other wavefront sensor, indicated by block 130. Such sensors are well known in the art and may be that illustrated in U.S. Pat. No. 4,399,356 or any other convenient sensor. The detector associated with the sensor is indicated by block 132, which represents an array of N detectors, such as quadrant detectors, that will produce electrical signals going to digitizer 135, that converts the analog signals from the detectors to digital representations of those values. The digital representations then go to processor 140 which compares adjacent sensors and sends a digital representation of the tilt of the wavefront (or the derivative of the phase) to reconstructor 150, which will be constructed according to the invention. The output of reconstructor 150 is a set of signals going to driver 160 which translates between the representation of the phase coming from reconstructor 150 to a set of signals corresponding to the drivers on the flexible surface of deformable mirror 125. Driver 160 then stretches or compresses the actuators in mirror 125 to control the surface 127 to produce the desired phase change.

Within reconstructor 150 there will be an array of parallel processing nodes, one for each sensor in digitizer 135. These processing nodes will be arranged in a rectangular array, each member of which will have a local memory having different memory addresses, an ALU for executing different instructions to shift, add, etc., and input/output hardware for shifting data to different nodes.

Reconstruction is the operation that converts a set of discretely sampled values representing the X and Y directional derivatives of an optical wavefront into another set of numbers representing the discrete values of the phases of this wavefront as they might be measured on another grid, such as one centered on the locations of actuators on a deformable mirror. The reconstruction problem can be thought of as the problem of solving the discretized version of a partial differential equation subject to various types of boundary conditions. The problem could also be thought of as the solution to a matrix equation whose solution is mathematically straight forward. The dimensions of the matrix will be proportional to the number of input measurement points times the number of output points. In a typical system, these will be the number of input points where wavefront measurements are made and the number of output points represented as 2N and N, respectively. The factor of two comes from the measurement of both X and Y coordinates. The number of matrix elements in the matrix will be therefore proportional to $N^2$.

In the linear approximation that is usually used for equation solution, only simple multiplications and additions are performed, but the number of these will be of order $N^2$. The dilemma of the system designer is that the number of operations required to perform the calculation in a time that is short ( on the order of a thousandth of a second) will increase quadratically as the size of the samples increases. Clearly, a single processor can not handle this problem and parallel processing systems will be required.

In order to establish a basis for comparison with the technique described below, a number of numerical simulations were performed on a conventional minicomputer using the classical relaxation technique, which is a method for solving a set of a coupled differential equations in which the equations are used to convert an approximate solution at stage K into another approximate solution at stage K+1. A rough guess was used as an initial assumption for the case K=0. These numerical solutions investigated the number of iterations required to converge the initial approximation to within a certain range of the true solution.

For a deformable mirror, the displacement of the reflective surface is described by Poisson's equation. The iterative method of obtaining a solution to the Poisson equation is simply to proceed through the array of sample points and to assign to each sample point within the region a value equal to the average of the surrounding four sample points. Multiple passes through the array of points should cause the average value at a sample point to converge to the solution of the finite difference equation.

$$P_k(x,y) = [P_{k-1}(x-1,y) + P_{k-1}(x+1,y) + P_{k-1}(x,y-1) + P_{k-1}(x,y+1)]/4 - d(g_x,g_y) \quad (1)$$

Equation 1 illustrates an approximation in which $P_k(x,y)$ is the kth approximation to Poisson's equation, the $P_{k-1}(x,y)$ are the approximate versions at the points x,y for the previous iteration, and $d(g_x,g_y)$ is a function of the external gradients as measured by the wavefront processor. It has been found that the deviation between the approximate solution and the true solution is of the form indicated by Equation 2.

$$\text{Error}_{RMS} \alpha 10^{-aI/M}, \quad (2)$$

where I is the number of iterations, N is the number of data points, and a is a proportionality constant. This equation shows that, as expected, the error decreases as the number of operations increases and, significantly, for a given error, the number of iterations required to achieve that error is proportional to N. Thus, for a conventional approach, the number of operations required to achieve a desired level of accuracy grows as the square of the number of grid points because the number of operations for each iteration is proportional to the number of grid points.

Figure 5A:
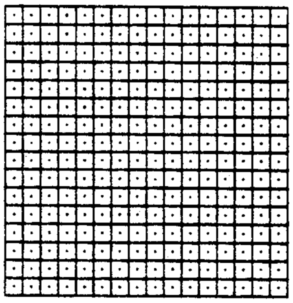
FIGS. 5*a*–5*l* illustrate a sequence of operations of transforming data according to the invention.

Observation of the numerical solutions referred to above indicated that the fine-scale features appeared quite quickly, but that the large-scale features of the solution took many iterations to appear. This raised the question of a method of imposing upon the data the large-scale features A sequence of operations in which this can be done is illustrated schematically in FIGS. 5(a) to 5(*l*).

The approach taken is to compress the data by forming an average value for a set of neighboring data points and to repeat this averaging process as many times as required to compress the data to a number of points that may be handled by an array of parallel processors of reasonable size. This final set of compressed data is the input to an iterative solution of Poisson's equation. That initial solution is used in an expansion process that is the inverse of the compression process. At the kth iteration level, the values of (k−1)th level solution are replicated to form an initial approximation for the kth level.

FIG. 5(*a*) illustrates a 16×16 array of data points, each of which represents both a point on a reference surface on a phase front and also an individual processing node in an array that will be described below. In FIG. 5(*b*) these data points have been reduced to one quarter of the number by substituting for each point in FIG. 5(*b*) the average of four neighboring points in FIG. 5(*a*). By convention, the point in the lower right-hand corner of each group of four points was chosen to carry the average value of that group of points. This point or another conventional point will be referred to as the transfer member of the set. In FIG. 5(*c*) this new second set of data points has been transferred to another contiguous array, now having dimension 8×8. In FIG. 5(*d*) the process of compression is repeated a second time to form a 4×4 array. These data are then input to a processing system that solves the three equations directly using Equation 1 or any other convenient method of solution.

This first solution has as input data a set of sixteen points that are the result of two successive averagings and thus contain only the coarsest features of the input data. It is this solution that will represent the overall large-scale features of the final solution to the equations.

Once this first solution has been obtained, the inverse of the averaging process is carried out. FIG. 5(*g*) illustrates the first step, in which the value of each of the sixteen points is copied or replicated to corresponding points in an 8×8 array and then duplicated in a square of four points. Thus, the 4×4 array for the first solution is transformed to a 8×8 array, in which groups of four processors have the identical input data. The equations are then solved on this 8×8 array of processors, using the replicated data as the first approximation and the averaged data from the first array for the boundary conditions, to result at the second solution. This second solution will result from a variable number of iterations, depending upon the convergence criterion being used and the shape of the phase front. When a satisfactory solution has been obtained at the second level, the process is repeated and each point of the 8×8 array is replicated into four points in the final 16×16 array. This 16×16 array is then iterated as many times as are required in order to arrive at the final solutions.

It has been found that in the case of full aperture tilt, a common error in optical systems, the number of iterations on each level that is required for solution convergence is proportional to the log of the number of points being evaluated. The actual number of iterations is around 12 for N on the order of 1,000.independent of the number of points, being about 12 for the case evaluated. Thus, the method described has changed the problem from one requiring order $N^2$ operations to one in which the number of operations is proportional to NlogN.

This process has been described with a three-step procedure for simplicity. In actual operation, the number of data points may be well over a thousand and several times the number of levels may be required. As always, there will be an engineering trade-off between the number of levels of iteration to perform and time requirements and accuracy. In the embodiment of FIG. 5, in which each point on the array is a processing node including a node processor that will be an ALU and node input/output ports connected to adjacent processing nodes and local node storage, quite a bit of time is required to pass the data through the several processors in order to carry out the 4×4 average and to shift the averaged points to a contiguous array (and the inverse processes). In order for the data in the upper left corner of the 4×4 array to reach the corresponding upper left corner of the 8×8 array, it must pass through a number of processing nodes that is equivalent to the length of a side of the array (eight, on this level). The next level will require 16 shifts.

These shifting and compressing operations are carried out with the SIMD (Single Instruction Multiple Data) approach. The basic shift is accomplished by a combination of adding the contents of neighboring processing elements and masking out unwanted data as required. In the first step, between FIGS. 5a and 5b, each element has added to it the contents of the element to the west, with elements on the left side having a stored zero value added as a substitute for the missing element. This step may be expressed as: $A_{12}=A_{12}+A_{11}$, $A_{22}=A_{22}+A_{21}$, etc.

Next, each element has added to it the contents of the element to the north: $A_{22}=A_{22}+A_{12}$, which completes the compression of the first block of four data points. The array is then ANDed with a mask that has a value of zero for those points ($A_{11}$, $A_{12}$, $A_{21}$ in this set of four points) that are no longer needed and a value of one for the points to be preserved. ($A_{22}$). The result of the masking operation is that only the processing nodes in the lower right corner of each group of four will have a non-zero value.

Figure 5B:
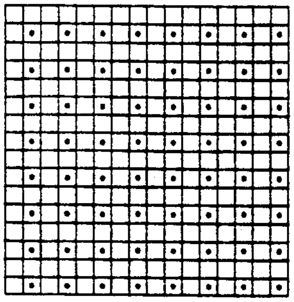
Figure 5C:
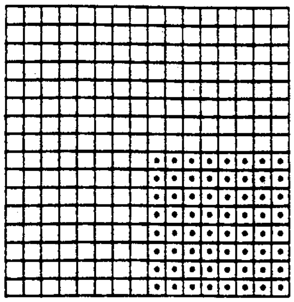
Figure 5D:
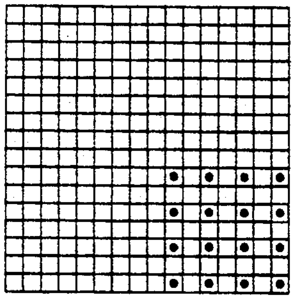
Figure 5E:
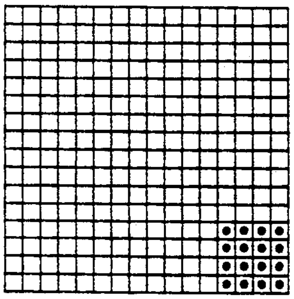
Figure 5F:
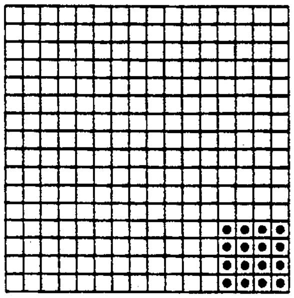
Figure 5G:
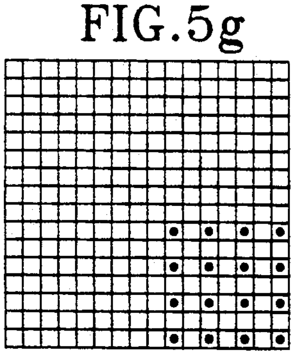
Figure 5H:
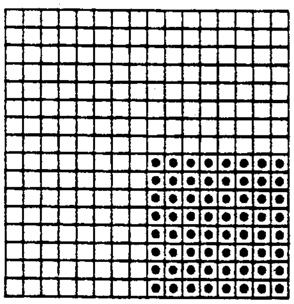
Figure 5I:
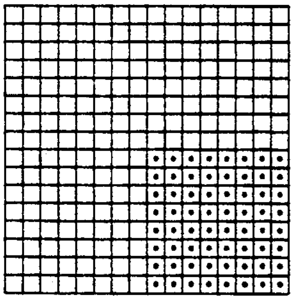
Figure 5J:
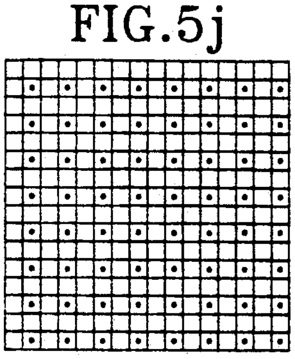
Figure 5K:
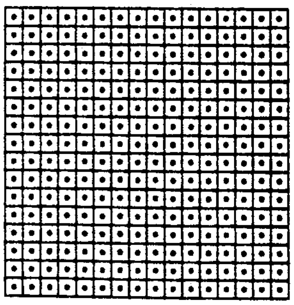
Figure 5L:
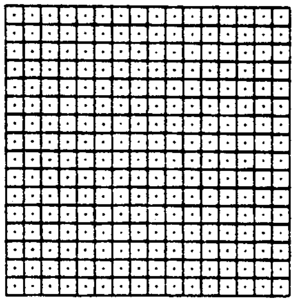

The process of further compression that transforms FIG. 5b to FIG. 5c is illustrated in FIG. 9. The same steps of addition listed above are used to shift the data to the intermediate positions shown in FIG. 9b. Since the "white" positions contain the value zero, the values of the data are not affected during the shift. The new value of $A_{33}$ is that of the old value of $A_{22}$, because the intermediate points have the value zero. Similarly, the new value of $A_{44}$ is its old value, because only zeroes were added to it.

Figure 9A:
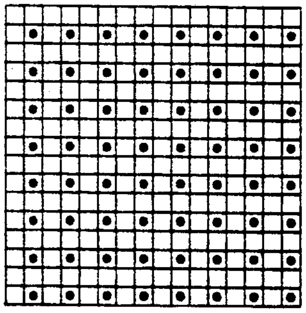
FIGS. 9*a*–9*d* illustrate intermediate steps in FIG. 5.
Figure 9B:
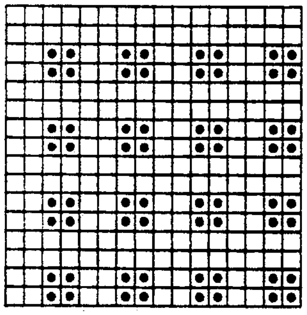
Figure 9C:
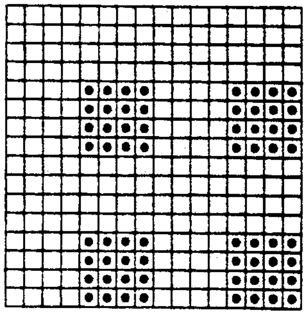
Figure 9D:
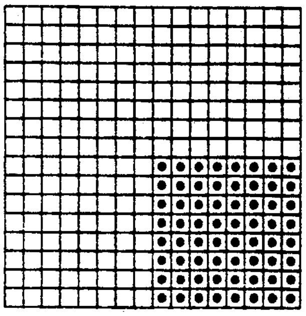

After a remask to clear up unwanted data, the shifting process is repeated with a new algorithm: $A_{xy}=A_{(x-2)y}+A_{xy}$, which transforms to the configuration of FIG. 9c. The notation here, (x−2)y, is that the data in processing node x,y has added to it the data from the node two positions to the left. The particular hardware used has a pass through facility that permits the transfer of data through an intermediate processing element without The last step to produce the configuration of FIG. 9d is implemented with an algorithm: $A_{xy}=A_{(x-4)y}+A_{xy}$. Both these preceding algorithms use intermediate masking steps as required to eliminate unwanted data.

Figure 6:
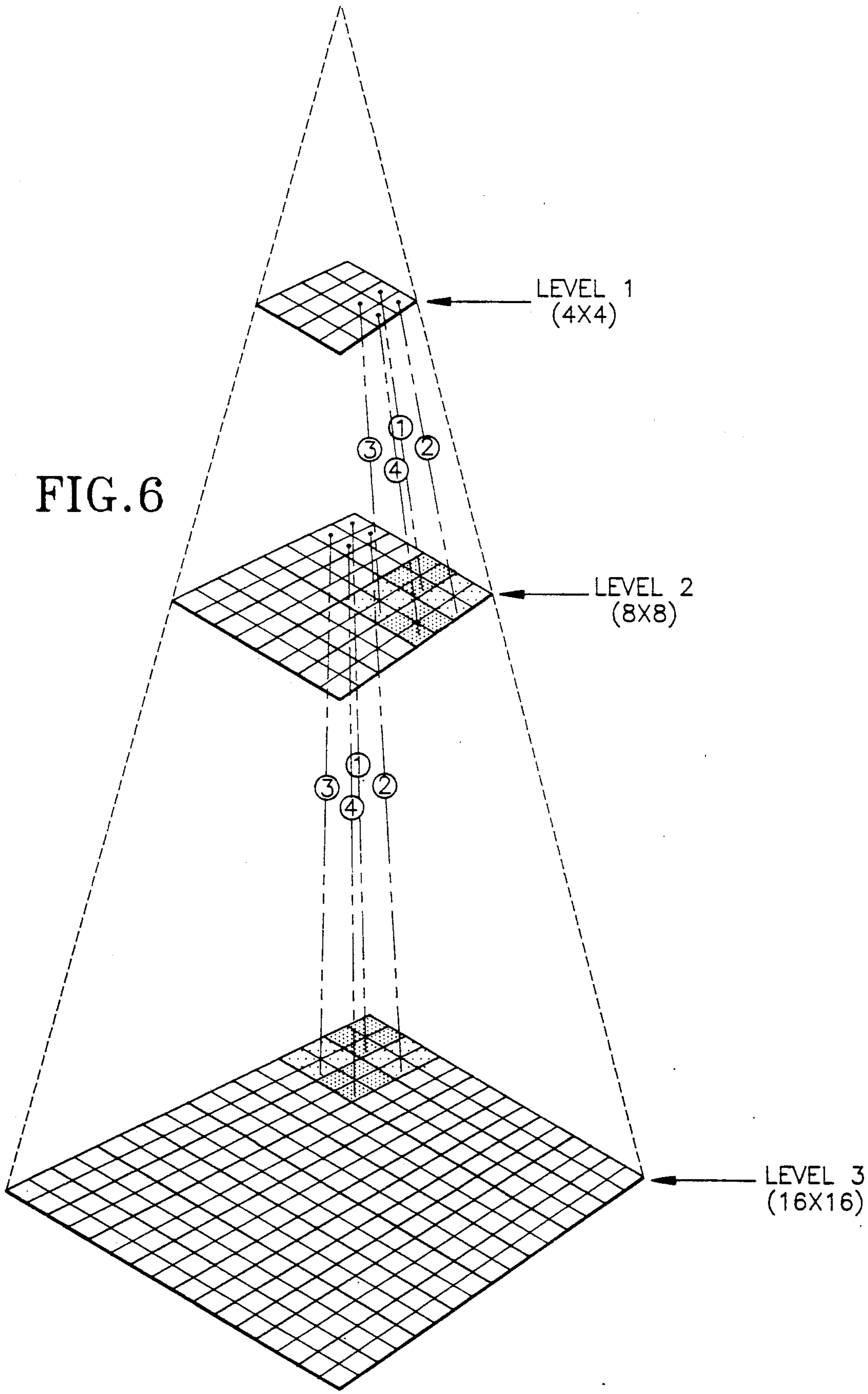
FIG. 6 illustrates pictorially the relationships of different sets of data points used in processing according to the invention.

The embodiment of FIG. 6 illustrates an alternative version of a processor in which the processing nodes are arranged in different "planes" that can operate simultaneously. The bottom level of the "pyramid" is the 16×16 original array; the middle 4×4 array. In this case, corresponding points in the compression sequence are connected by wires extending upwardly from one array to another, so that the data is transferred from a lower-right-hand-corner processing node, referred to as a "transfer node" to a corresponding node in the next level without being shifted through additional processing nodes. In hardware, this would be implemented by connections between different printed circuit boards. These connections and any required temporary storage buffers, etc., together with controlling hardware, will be referred to as array transfer means. Only a few such lines are shown in FIG. 6 to avoid creating an unduly complex drawing. In this case, the compression time will be reduced to that required to make one transfer instead of a number that is the length of a side. This embodiment can be implemented with the planes physically separated as shown, or with the components physically interleaved, but electrically separated according to the drawing.

Figure 2:
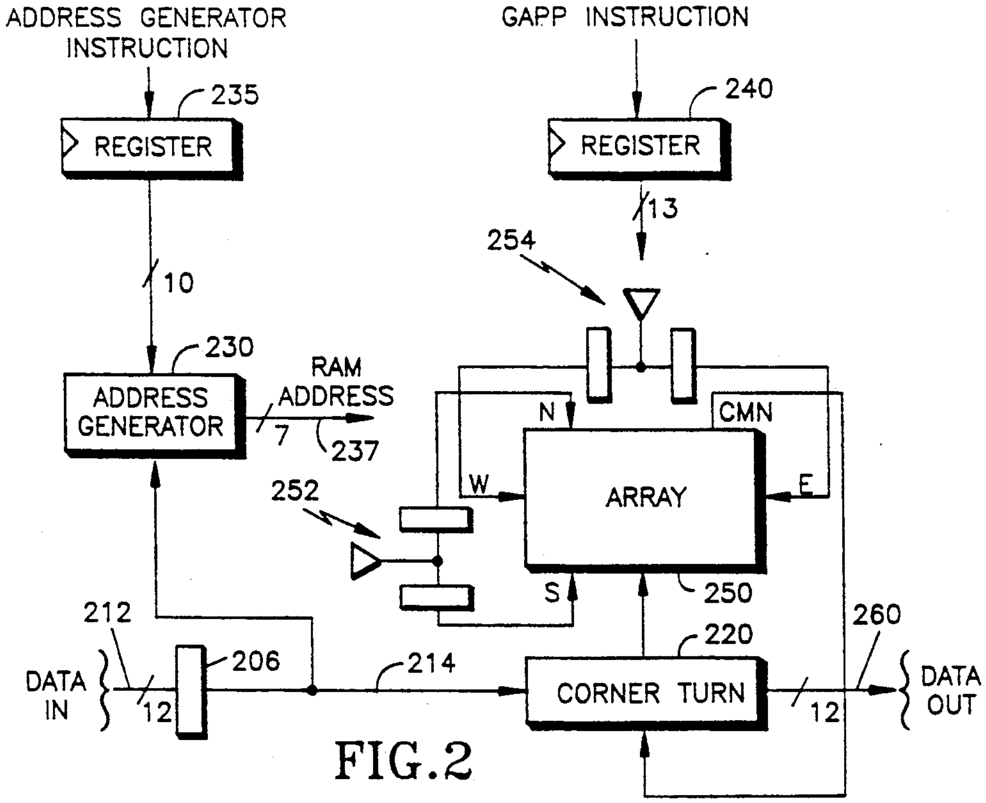
FIG. 2 illustrates in schematic form an implementation of a processor array according to the invention.

In FIG. 2, there is a representation of a level of the pyramid of FIG. 6. Data enters on line 212 to buffer 206, then passes on line 214 to the input to the array of processors formed in a single integrated circuit 250. This input is indicated as box 220, the contents of which will be discussed below. The data enters array 250, illustratively a 6×12 array of processors. Lines around the outside of box 250 indicate the transfers may be "looped" around from North to South and vice versa and from East to West and vice versa. This is not essential, but is a great convenience in moving data between the various nodes. The two sets of buffers and controllable terminal 252 and 254 are used to force data into the edges of array 250. The terminal may be set at logic zero or logic one and the buffers may be set to pass that value to either or both sides of the array. This array is constructed from commercially available unit, the NCR45CG72 "GAPP" chip, available from the National Cash Register Corporation, which include a CMOS systolic array with 72 single bit processors per chip, arranged as a grid of 6×12, organized on the principle of single instruction multiple data; i.e., all the processors execute the same instruction at the same time on the data that is present at their nodes. Box 240 is a register for storing the instruction to be delivered to all the processors. On the left of the Figure, address generator 230 generates an address within local memory, common to the whole array, which may contain stored data or a stored instruction sequence.

FIG. 3 illustrates the contents of "corner turn" box 220 which performs a parallel to serial conversion and also performs shift register functions. In operation, data enters from line 214 as a set of six eight-bit words in this particular embodiment, which are loaded sequentially into the various modules 222. These words are then shifted one bit at a time serially up in the Figure on the lines labeled CMS 0-5 and enter the bottom portion of array 250. Data coming out of the top of the array is looped around and enters in from below to individual modules 222. Data is taken out of the array by looping in from below to each of modules 222 and then by shifting in parallel a byte at a time out to the right in the Figure. The number of modules used in any embodiment will depend on the size of the array and the method of passing data through the individual processors in the array. In the case illustrated, the array was of dimension 6×12, so that the appropriate number of modules was six.

The terminology used will be that the system has control means, which includes the address generator 230, GAPP instruction unit 240, a finite state machine or CPU not shown to control the sequence of instructions and associated connections. The term calculation means includes the processing nodes and the term shift means includes input/output ports at the processing nodes and corner turn 220. In the prior art, the nth solution generated by a single CPU was fed back in (through conventional buses, registers, memory, etc.) to the CPU to be used for the (n+1)th iteration. The set of hardware collectively used to effect the transfer will referred to as a feedback means.

A block diagram of a single processing element in a GAPP chip is illustrated in FIG. 4, in which ALU 252 forms the central element that is connected to other nodes through two boxes labelled NS and EW, respectively. The boxes represent multiplexers connected to four ports (N,S,E,W) that are general communications lines. The boxes labelled CMS and CMN are ports that are used to load and unload data without interfering with the processing. These units are connected to a set of six bidirectional I/O ports connected to adjacent processing elements A $128\times1$ RAM is available for storing data, such as values shifted into this node or temporary results. Instructions are not stored locally in this embodiment, which operates on the SIMD (Single Instruction Multiple Data) principle, in which all nodes execute the same instruction simultaneously. The box labelled C is used for a carry bit and the box labelled CM is a pass through connection from the North to South ports that facilitates transfer to and from the I/O box 220 of FIG. 2. Instructions and control signals for loading data in and out of the chip are omitted from the Figure for clarity.

The apparatus shown in FIG. 2 is controlled by any convenient means such as a general purpose computer that contains the stored instructions for generating the sequence of data transfer shifts and iterative equation solving to be described below.

Figure 7:
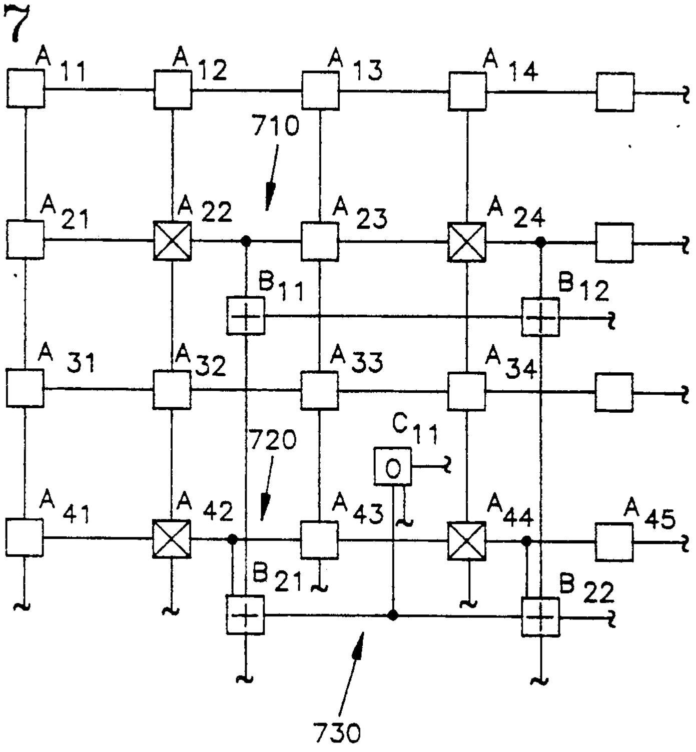
FIG. 7 illustrates schematically an interconnection scheme for different processors using the approach illustrated in FIG. 6.

An alternate version of a portion of the pyramid embodiment of FIG. 6 is illustrated in FIG. 7, showing in partially schematic, partially pictorial fashion a portion of a circuit board including three levels of such a pyramid. Each box in the Figure is a processing node, whether one-bit or some higher number. The lines are buses of appropriate width for the number of bits. A $4\times4$ section of the array, the boxes of which are denoted by the letter A is the lowest level, with the boxes denoted by B being the second level and the single box denoted by a C as the third level. The portion shown is the upper left corner of an array that extends to some convenient distance off the paper.

Data is loaded into the A array by external buses not shown in the drawing in an initial step. Referring for illustration to the upper left portion of the Figure, the first data compression step involves the simultaneous addition to all elements of the contents of the element to its west, i.e. $A_{12}=A_{12}+A_{11}$ and $A_{22}=A_{22}+A_{21}$ followed by the simultaneous addition to all elements of the contents of the element to its north, i.e. $A_{22}=A_{22}+A_{12}$. Optionally, the sum in $A_{22}$ may be divided by four if it is desired to keep the data in scale. Corresponding transfers take place in the other groups of four, both at the A level and at the B and C levels. Once the data is stored in the lower right corner, it is transferred between levels. The data in $A_{22}$ is transferred through node 710 to $B_{11}$ and vice versa for the inverse expansion step. Similarly, data in $A_{24}$, $A_{42}$, and $A_{44}$ are transferred to corresponding nodes $B_{12}$, $B_{21}$, and $B_{22}$. It doesn't matter which set of data is transferred first. For purposes of illustration, processor nodes $B_{11}$ and $B_{12}$ are shown as being connected directly to a node 710 between two of the A processing nodes on the North side. Nodes $B_{21}$ and $B_{22}$ are shown as using a multiplexed input on the North side, in which one input is connected to the corresponding A node 720 and the other is a B-level bus connecting $B_{21}$ to $B_{11}$, etc. This multiplexed connection between the A and B nodes is not essential, but eliminates the need to watch the timing between the A and B levels to avoid getting data for the different levels mixed. With the A and B levels isolated, both levels can perform intra-level data transfer independently.

After the interlevel transfer, the A nodes will replicate the data—the contents of $A_{22}$ will be duplicated in $A_{12}$, $A_{21}$, and $A_{12}$—the A nodes will iterate to a solution of Poisson's equation. Simultaneously with the A level iteration, the B level will be iterating data that was passed down from the C level. One sequence for such a pipeline processing scheme is, for the nth level:

a) Send down to the (n−1)th level the result of the iteration just completed.

b) Send up to the (n+1)th level data from the (n−1)th level and stored during the iteration of step a).

c) Receive from the (n−1)th level and store data to be passed on after the next iteration.

d) Receive from the (n+1)th level a new set of data and replicate.

e) Iterate on current data received in step d).

The order in which the data is shifted is not critical and different sequences having the same effect will be evident to those skilled in the art. The requirements are that each level be able to store a set of data during the iteration process, to be sent up to the next level during the inter-iteration transfer period.

Referring now to FIG. 8, there is shown in schematic form an illustration of a processing node suitable for use with the invention. Preferably the processor will handle a reasonable width word, such as 16 bits, but no particular number is required. Input multiplexer 810 has four ports corresponding to the four directions in which data will be transferred. As discussed above with respect to FIG. 7, it may be convenient to have an additional multiplexer 805, shown in dotted lines, to facilitate transfer between levels. As shown in FIG. 7, $B_{22}$, for example, transfers data to and from $A_{44}$, with appropriate control signals being sent to the two modules to transfer and receive the data. Secondary multiplexer 820 serves to direct input or output data into ALU 840 or to direct stored data from RAM 830 into the ALU. Ram 830 can be used to store data during iterations or in the regular ALU operation. The processing requirements on the node hardware are that it be able to solve an equation of the form $y=ax+b$ (the linearized approximation to the equations of interest) and to have some local storage. An adder is insufficient because the data compression operations require masking (or an erase command). Multiplication capability is convenient, but not essential. The I/O requirement is two bidirectional ports or four unidirectional ports. As shown in FIG. 8, four bidirectional ports are preferred.

Control of individual nodes is performed using a command common to all nodes, so that local storage of commands is not required. Processors on the edge will be dealing with only three neighbors instead of the usual four. This may be handled as described above by loading in zeroes for initial data to substitute for a missing neighbor.

An important limitation in system layout design is the amount of time taken to move data through the system. Referring to the 16×16 layout of FIG. 5, it can be seen that if data are entered from both the North and South, it will take eight loading cycles to load or extract data, with each node passing data to its nearest neighbor. Buses may be run through the board to break the total array size down to something with a faster loading time. As always, there will be a tradeoff between board space taken up by buses and complexity of interconnections and speed.

For applications in which the sensors that produce the raw input data are not uniform or are exposed to radiation having different signal to noise ratios, the system offers the additional advantage that the calculations can be weighted to favor the better data.

It should be understood that the invention is not limited to the particular embodiments shown and described herein, but that various changes and modifications may be made without departing from the spirit and scope of this novel concept as defined by the following claims.

What is claimed is:

1. A system for processing a set of input digital data to calculate a set of output data by iteration of a set of equations and having input/output means, feedback means, control means and calculation means, in which a set of input data representing approximate values of a function at selected points in a predetermined region are fed through said input/output means into at least one processor configured to generate, for each of said selected points, an interim solution to said set of equations based on said input data, said interim solution having interim solution values at said selected points that form a set of nth output data that is fed through said feedback means into said at least one processor as a set of (n+1)th input data to generated an (n+1)th interim solution until a predetermined criterion is met, whereupon the current interim solution values are transferred to said input/output means, said calculation means includes a plurality of processing nodes, each comprising a node processor responsive to a set of node instructions, node input/output means connected to said node processor and to at least one adjacent node input/output means, and node storage means connected to said node processor;

said control means and calculation means includes means for shifting and compressing data from a predetermined kth set of processing nodes to a predetermined (k+1)th set of processing nodes, said (k+1)th set of processing nodes having a smaller number of nodes than said kth set of processing nodes and a predetermined relationship to said predetermined kth set of processing nodes, until an initial set of data distributed-in an initial set of processing nodes is transformed by shifting and compressing at least twice to a final set of data distributed in a final set of processing nodes;

said calculation means includes means for controlling said final set of processing nodes to solve said set of equations in parallel to arrive at a first interim solution based on said final set of data having a first solution set of interim values on said final set of processing nodes;

said means for shifting and compressing data includes means for expanding and shifting said first interim solution set of interim values to form a second set of input values on that set of processing nodes immediately preceding said final set of processing nodes and solving said set of equations to form a second interim solution having a second interim set of values; and said control means and calculating means includes means for repeatedly expanding and shifting at least two interim sets of values to form successive sets of input values and solving said set of equations to form a final solution.

2. A system according to claim 1, further characterized in that said means for shifting and compressing data includes shift control means for controlling subsets of said processing nodes to combine data contained in each of a predetermined number of subsets of said kth set of processing nodes, each subset comprising a predetermined number of nodes in said kth set of processing nodes, into combined data in a predetermined transfer member of said subset of said kth set of processing nodes and then to transfer said combined data from said transfer member to a corresponding processing node in said (k+1)th set of processing nodes, thereby defining a relationship between each member of said (k+1) set of processing nodes and said predetermined transfer members of said kth set of processing nodes.

3. A system according to claim 2, further characterized in that said shifting means includes array transfer means for passing said combined data from said predetermined transfer member of said kth set of processing nodes to said corresponding processing node in said (k+1)th set of processing nodes without passing through an intermediate processing node.

4. A system according to claim 3, further characterized in that said kth set of processing nodes are interconnected in a kth array and said (k+1)th set of processing nodes are interconnected in a (k+1)th array, said kth array and said (k+1)th array being connected through said array transfer means for passing data.

5. A system according to claim 4, further characterized in that each of said kth array of processing nodes and said (k+1)th array of processing nodes includes node storage means sufficient to store data contained in said node processors and said shifting means includes means for transferring kth current data in said kth array transfer nodes to kth array node storage means, transferring (k+1)th current data in said (k+1)th array to said transfer members of said kth array, storing said (k+1)th current data in transfer node storage means associated with said transfer nodes, and transferring kth solution values in said kth array transfer node storage means to said (k+1)th array processing nodes, whereby said system is capable of operating in a pipeline mode in which data undergoing compression is shifted from said kth array to said (k+1)th array and interim solution values are shifted from said (k+1)th array to said kth array.

6. A system according to claim 4, further characterized in that each of said kth array of processing nodes and said (k+1)th array of processing nodes includes node storage means sufficient to store data contained in said node processors and said shifting means includes means for transferring kth current data in said kth array transfer nodes to kth array node storage means, transferring (k+1)th current data in said (k+1)th array to said transfer members of said kth array, storing said (k+1)th current data in transfer node storage means contained within said transfer nodes, and transferring said kth current data in said kth array transfer node storage means to said (k+1) array processing nodes, whereby said system is capable of operating in a pipeline mode in which data undergoing compression is shifted from said kth array to said (k+1)th array and interim solution values are shifted from said (k+1)th array to said kth array.

7. A system according to claim 1, further characterized in that said plurality of processing nodes has four orthogonal boundaries and in that said calculation means includes means for shifting data from a first boundary set of processing nodes along a first boundary to a second set of boundary nodes along a second boundary opposite to said first boundary.

8. A method of processing a set of input digital data to calculate a set of output data by iteration of a set of equations in an apparatus having input/output means, feedback means, control means and calculation means, in which a set of input data representing approximate values of a function at selected points in a predetermined region are fed through said input/output means into at least one processor configured to generate, for each of said selected points, an interim solution to said set of equations based on said input data, said interim solution having interim solution values at said selected points that form a set of nth output data that is fed through said feedback means into said at least one processor as a set of (n+1)th input data to generate an (n+1)th interim solution until a predetermined convergence criterion is met, whereupon the current interim, solution values are transferred to said input/output means, said calculation means including a plurality of processing nodes, each comprising a node processor responsive to a set of node instructions, node input/output means connected to said node processor and to at least one adjacent node input/output means, and node storage means connected to said node processor; and said control means and calculation means including means for shifting and compressing a kth set of data from a predetermined kth set of processing nodes to a predetermined (k+1)th set of processing nodes, said (k+1)th set of processing nodes having a smaller number of nodes than said kth set of processing nodes and a predetermined relationship to said predetermined kth set of processing nodes, comprising the steps of:

loading an initial set of data into a first set of processing nodes through said input/output means and under control of said control means;

shifting and compressing said initial set of data to a second set of data in a second set of processing nodes related to said initial set of processing nodes in a predetermined manner;

repetitively shifting and compressing successive sets of data to a final set of data distributed in a final set of processing nodes;

solving said set of equations in parallel in said final set of processing nodes to arrive at a first interim solution based on said final set of data having a first solution set of interim values on said final set of processing nodes;

expanding and shifting said first interim solution set of interim values to form a second set of input values on that set of processing nodes immediately preceding said final set of processing nodes and solving said set of equations to form a second interim solution having a second interim set of values;

repetitively expanding and shifting intermediate solution sets related to said first solution set until a final solution set is solved on said first set of processing nodes.

9. A method according to claim 8, further comprising the steps of:

shifting and combining data in selected subsets of said processing nodes to combine data contained in each of a predetermined number of subsets of said kth set of processing nodes, each subset comprising a predetermined number of nodes in said kth set of processing nodes, into a predetermined transfer member of said subset of said kth set of processing nodes and transferring data so combined from said transfer member to a corresponding processing node in said (k+1)th set of processing nodes, thereby defining a relationship between each member of said (k+1)th set of processing nodes and said predetermined transfer members of said kth set of processing nodes.

10. A method according to claim 9, in which said kth set of processing nodes and said (k+1)th set of processing nodes are embodied in physically distinct hardware and capable of simultaneous operation and further comprising the steps of pipeline transferring data from said kth set of processing nodes to said (k+1)th set of processing nodes and transferring interim solution values from said (k+1)th set of processing nodes to said kth set of processing nodes by storing kth compressed data from said kth set of processing nodes and interim solution values from said (k+1)th set of processing nodes in predetermined storage means, transferring in a predetermined sequence said compressed data from said kth set of processing nodes to said (k+1)th set of processing nodes, and transferring interim solution values from said (k+1)th set of processing nodes to said kth set of processing nodes.

11. A method according to claim 10, in which said kth set of processing nodes and said (k+1)th set of processing nodes operate simultaneously to solve respective kth and (k+1)th sets of interim values.

* * * * *

UNITED STATES PATENT AND TRADEMARK OFFICE
CERTIFICATE OF CORRECTION

PATENT NO. : 5,119,323 Page 1 of 2

DATED : June 2, 1992

INVENTOR(S) : K. S. Nickerson, M. C. Reynolds, A. Jankevics

It is certified that error appears in the above-identified patent and that said Letters Patent is hereby corrected as shown below:

Column 3, line 50, "$Error_{RMS} \propto 10^{-al/M}$," should read --$Error_{RMS} \propto 10^{-al/N}$,--

Column 3, line 68, "features A" should read --features. A--

Column 5, line 60, after "without" insert --affecting the data in that intermediate element.--

Column 6, line 1, after "middle" insert --level is the 8 x 8 array; and the top level is the final--

Column 7, line 24, "elements A" should read --elements. A--

Column 9, line 41, after "means," insert in bold letters --CHARACTERIZED IN THAT:--

Column 10, line 24, "(k+1)" should read --(k+1)th--

Column 10, line 58, "claim 4" should read --claim 3--

UNITED STATES PATENT AND TRADEMARK OFFICE

CERTIFICATE OF CORRECTION

PATENT NO. : 5,119,323 Page 2 of 2

DATED : June 2, 1992

INVENTOR(S) : K. S. Nickerson, et al

It is certified that error appears in the above-indentified patent and that said Letters Patent is hereby corrected as shown below:

Column 11, line 2, "(k+1)" should read --(k+1)th--

Signed and Sealed this

Fourteenth Day of November, 1995

Attest:

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,119,323

DATED : June 2, 1992

INVENTOR(S) : Kelsey S. Nickerson, et al

It is certified that error appears in the above-indentified patent and that said Letters Patent is hereby corrected as shown below:

Column 9, line 57, "distributed-in" should read --distributed in --.

Signed and Sealed this

Twenty-sixth Day of December, 1995

Attest:

BRUCE LEHMAN

*Attesting Officer*

*Commissioner of Patents and Trademarks*